United States Patent
Morimoto (10) Patent No.: US 6,804,130 B2
(45) Date of Patent: Oct. 12, 2004

(54) INVERTER DEVICE AND CURRENT LIMITING METHOD THEREFOR

(75) Inventor: Shinya Morimoto, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/332,509

(22) PCT Filed: Jul. 10, 2001

(86) PCT No.: PCT/JP01/05986

§ 371 (c)(1),
(2), (4) Date: Jan. 10, 2003

(87) PCT Pub. No.: WO02/05415

PCT Pub. Date: Jan. 17, 2002

(65) Prior Publication Data

US 2004/0052097 A1 Mar. 18, 2004

(30) Foreign Application Priority Data

Jul. 12, 2000 (JP) .................................. 2000-211426

(51) Int. Cl.⁷ .......................................... H02M 7/5387
(52) U.S. Cl. ...................... 363/132; 363/98; 363/56.03; 363/41
(58) Field of Search .............................. 363/17, 41, 43, 363/56.02, 56.03, 56.07, 56.1, 98, 132; 318/561

(56) References Cited

U.S. PATENT DOCUMENTS 4,994,950 A * 2/1991 Gritter ........................ 363/41
5,959,422 A * 9/1999 Kang .......................... 318/561
6,490,185 B1 * 12/2002 Yamanaka et al. ............ 363/98

FOREIGN PATENT DOCUMENTS

| JP | 1-298993 | 12/1989 |
| JP | 9-47085 | 2/1997 |
| JP | 11-150998 | 6/1999 |

* cited by examiner

Primary Examiner—Jessica Han
(74) Attorney, Agent, or Firm—Sughrue Mion, PLLC (57) ABSTRACT

It is an object of the invention to provide an inverter apparatus capable of instantaneously limiting a current to prevent the breakdown of a device and operating an electric motor efficiently and stably.

The invention provides an inverter apparatus for carrying out a PWM modulation to output a voltage based on a voltage command vector obtained from a frequency command value Fref and a voltage command value calculated from the frequency command value by a V/f operation 7, comprising current detecting means 12a for detecting a current vector having a magnitude I1 of a current and a current phase θi, voltage limitation value calculating means 15 for calculating a voltage limitation value ΔV which is proportional to an excess when the magnitude of the current exceeds a current limitation value Imax, voltage limitation vector calculating means 16 for converting the voltage limitation value into voltage limitation vectors ΔVq and ΔVd based on the current phase, voltage correcting means 17 for adding the voltage limitation vector to the voltage command vector, and acceleration correcting means 11 for correcting an acceleration command of a frequency based on the voltage limitation value and the current phase.

8 Claims, 7 Drawing Sheets

INVERTER DEVICE AND CURRENT LIMITING METHOD THEREFOR

This application is a 371 of PCT/SP01/05986 Jul. 10, 2001.

TECHNICAL FIELD

The present invention relates to an inverter apparatus in which the suppression of an excess current is intensified when an induction motor is to be driven by V/f control.

BACKGROUND ART

Conventionally, a current is increased if a rapid acceleration is carried out or a load is suddenly changed when the induction motor is to be V/f controlled. In that case, when a current exceeding a tolerance flows to the semiconductor device of an inverter apparatus, the device is broken down. Consequently, an excess current level is set. When a current exceeding the excess current level flows, an excess current protecting function is fulfilled to prevent the breakdown of the device by gate breaking.

Referring to the gate breaking fulfilled by the excess current protecting function, moreover, restarting is required. For this reason, a current is limited and a semiconductor is protected by using a gate breaking circuit having the function of carrying out an automatic reset at a lower level than a previous excess current level or a current limiting circuit for outputting a 0 voltage pattern to a much lower level.

Furthermore, there has been performed control for paying attention to only the magnitude of a current, for example, a method of detecting the magnitude of a current to correct a frequency, and a method of stopping an acceleration if the current is increased during the acceleration and reducing a frequency if the current is increased during a stationary operation.

Next, description will be given to a specific example in which conventional V/f control is actually carried out.

Figure 5:
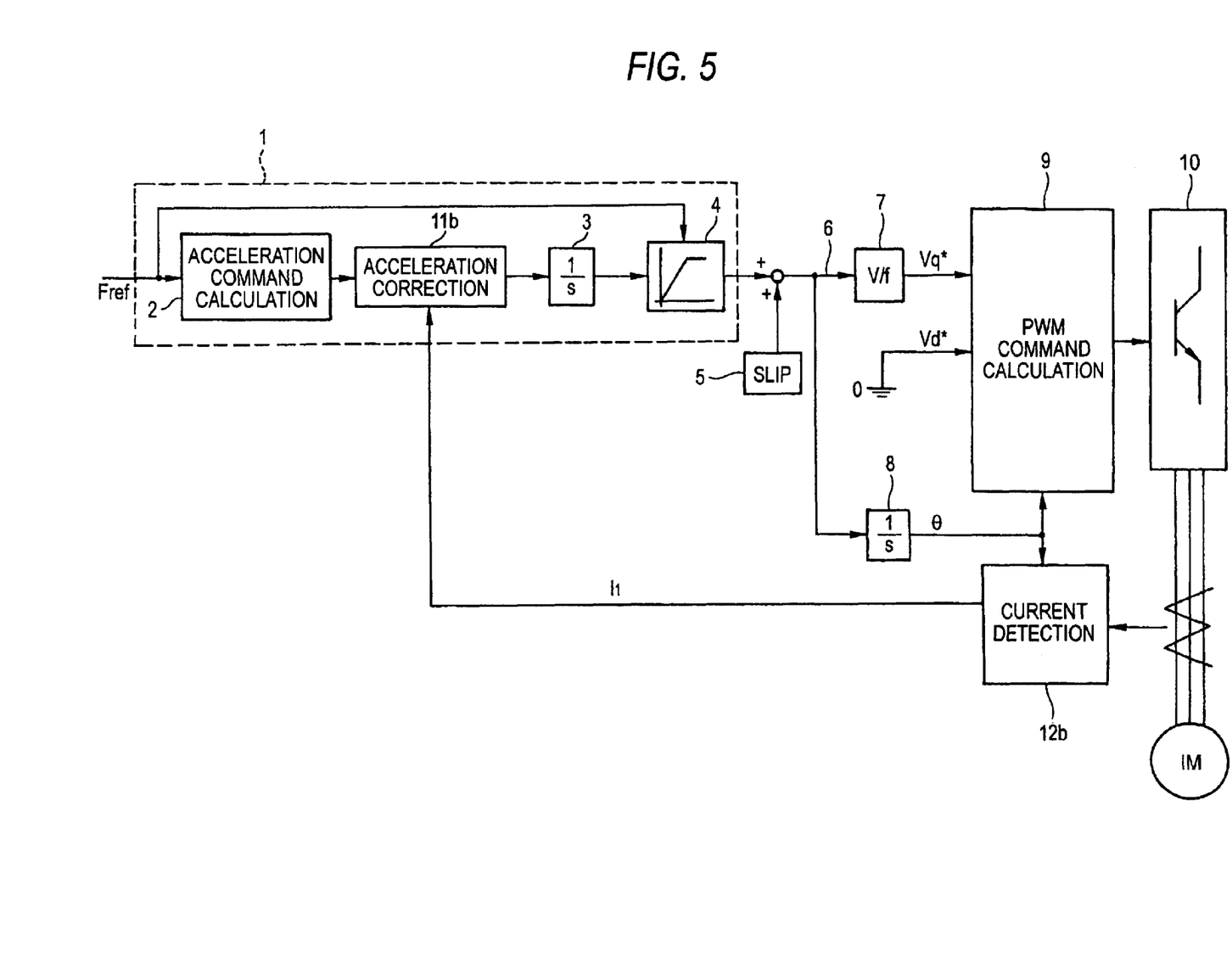
FIG. 5 is a control block diagram showing V/f control to be carried out by a conventional inverter apparatus.
Figure 8:
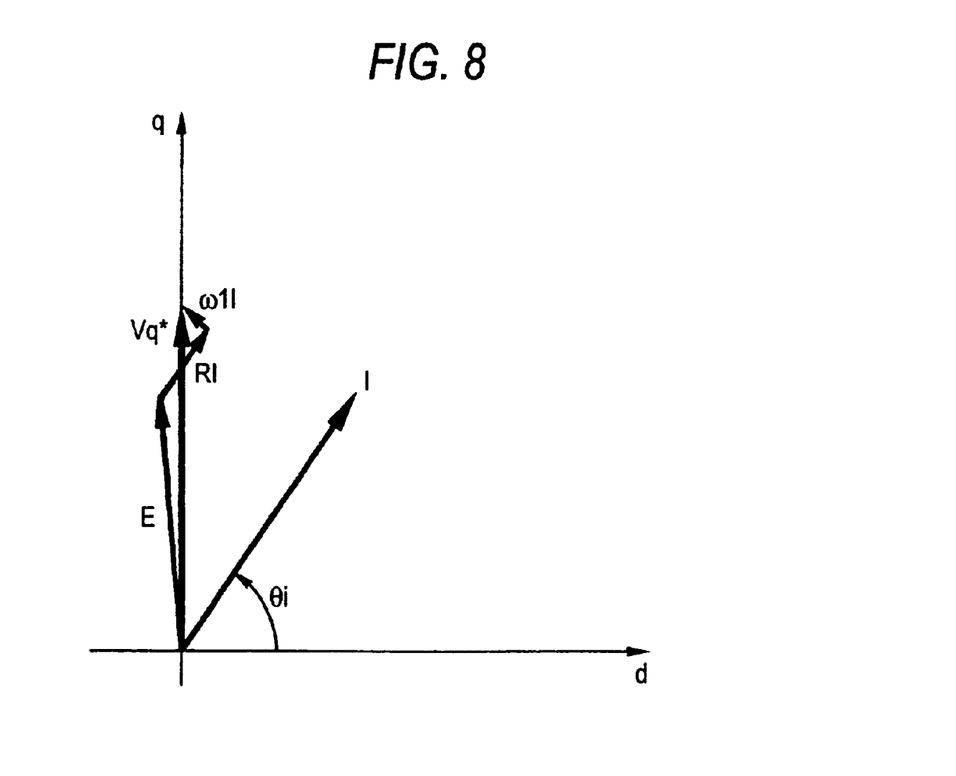
FIG. 8 is a vector diagram in the control of the conventional inverter apparatus.

FIG. 5 is a control block diagram showing the conventional V/f control. FIG. 8 shows an example of a voltage command Vq* and a current I in a certain power state in the V/f control shown in FIG. 5, and a voltage component of an electric motor, in which an axis d indicates a reference phase of a control output, illustrating a control configuration for controlling a voltage of an axis q set into a position at 90 degrees from the axis d.

In the V/f control shown in FIG. 5, θ represents a position of the axis d seen from a certain reference position (for example, a U phase). A frequency command calculating section 1 inputs a frequency command Fref and calculates an acceleration frequency from an acceleration time set by acceleration command calculating means 2, and integrates the acceleration frequency by acceleration frequency integrating means 3, stops an acceleration when a frequency command value set by command value limiting means 4 is obtained, and thus creates a frequency command at the present time.

Moreover, when a speed integrated by the acceleration frequency integrating means 3 is set to have a lower limit value to be a frequency command value by the command value limiting means 4 during a deceleration, the deceleration is stopped. Slip frequency means 5 calculates the slip frequency of an electric motor from a current detection value for a torque, thereby obtaining an output frequency 6.

Figure 7:
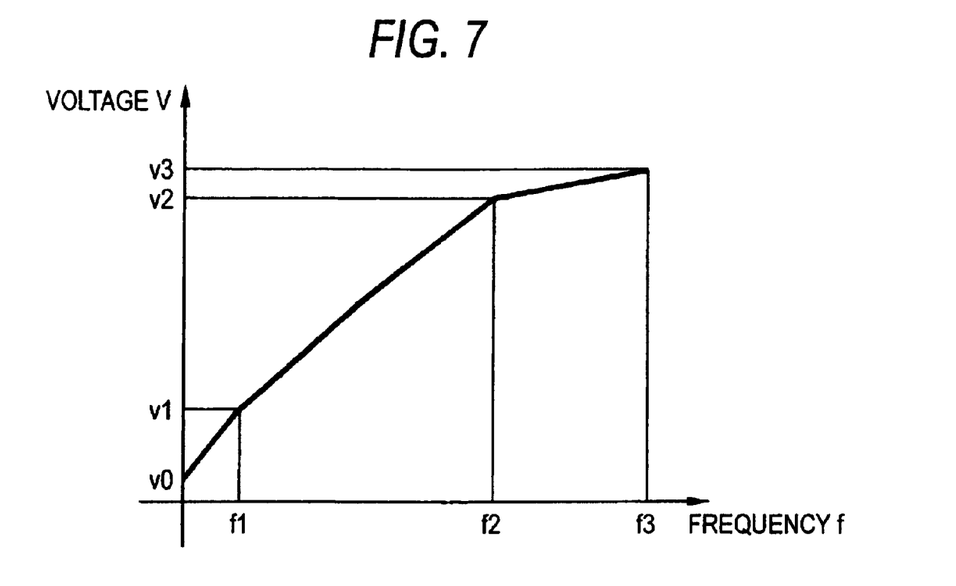
FIG. 7 is a chart showing a conventional frequency-voltage pattern.

A V/f calculating section 7 obtains the voltage command Vq* from the output frequency based on a frequency—voltage pattern shown in FIG. 7. Moreover, the output frequency is integrated by phase calculating means 8 to obtain an output phase θ, and a three-phase (UVW phase) voltage command is obtained from voltage commands Vq* and Vd* (a value of 0) and θ by a PWM command calculating section 9 and is converted into a PWM pattern, and the PWM pattern is output to a gate driver circuit 10 and a voltage is applied to an electric motor 1M.

Conventionally, a magnitude I1 of a current is detected by current detecting means 12b as stall (stop state) preventing measures, and an acceleration is delayed if any and the acceleration (deceleration) is carried out with a negative value during a stationary operation when the magnitude I1 is increased by acceleration correcting means 11b. In some cases in which a rapid acceleration is carried out or a load fluctuates suddenly, however, an increase in the current cannot be suppressed so that a stall is carried out due to the excess current protection of hardware.

Figure 6:
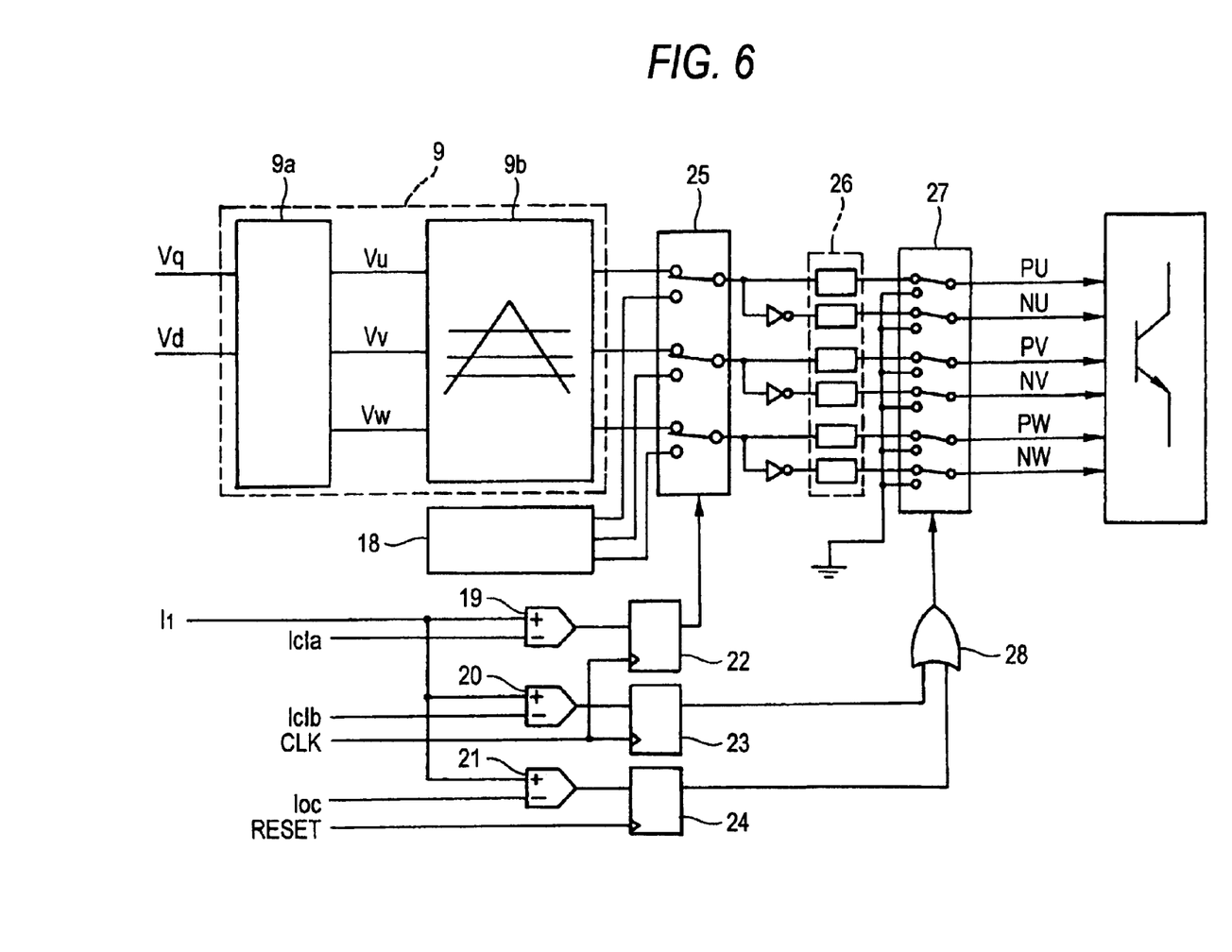
FIG. 6 is a block diagram showing the current limiting circuit of the inverter apparatus illustrated in FIG. 5.

For this problem, there are taken measures for creating a current limiting circuit shown in FIG. 6 to control a current, thereby preventing the stall.

As shown in FIG. 6, the current limiting circuit is added to an ordinary structure in which a conversion into a voltage having a UVW phase is carried out from the dq axes by voltage converting means 9a in the PWM command calculating section 9 and a PWM modulation is carried out over the same voltage by a triangular wave comparator 9b, and a gate drive signal is thus created through an inverting circuit and a non delay circuit 26. Consequently, the breakdown of a semiconductor device can be prevented. In the drawing, an excess current level is divided into three stages of:

Ioc>Ic1b>Ic1a, and a current detection value I1 is first compared with an excess current level Ioc by a comparator 21. When I1 is greater than Ioc, the result of the comparison is latched into a latch circuit 24 and a gate breaking signal is selected and output by a gate breaking selection circuit 27. The latch circuit 24 is reset in response to a reset signal sent from a controller in a predetermined timing.

If a current is smaller, a result obtained by comparing the current detection value I1 with a next current limitation level Ic1b by a comparator 20 is latched into a latch circuit 23 and a gate breaking signal is output by the gate breaking selection circuit 26. The comparator 20 and the latch circuit 23 will be referred to as a CLB circuit.

If the current is further smaller, the current detection value I1 is compared with a subsequent current limitation level Ic1a by a comparator 19. If I1 is greater, an on signal is latched into a latch circuit 22 and is sent to a 0 voltage switching circuit 25, and a 0 voltage pattern created by a 0 voltage pattern generator 18 is output. The comparator 19 and the latch circuit 22, and the 0 voltage pattern generating circuit 18 and the 0 voltage switching circuit 25 will be generally referred to as a CLA circuit.

The latch circuits 22 and 23 are automatically reset in a certain set timing CLK. Consequently, in the case in which the current detection value I1 is smaller than the excess current level Ioc and is greater than the current limitation level Ic1a, a gate drive signal having a fixed pattern is obtained. However, since gate breaking is not carried out, it is possible to continuously perform the operation while limiting the current. In the excess current preventing measures to be taken depending on only the magnitude of a current, the current is increased if a voltage is dropped in the regeneration state of an electric motor, and furthermore, a power is not supplied to the electric motor while the CLA and CLB circuits are operated. For this reason, it cannot be denied that an efficiency is reduced.

Examples of a method other than the correction to be carried out depending on the magnitude of a current include a method of correcting a voltage by using a voltage limitation vector in a reverse direction to the magnitude of a detected current and PI controlling the magnitude of the voltage limitation vector, thereby correcting a speed command.

In the case of the method in FIG. 6, however, the magnitude of the voltage is corrected from the magnitude of the current to carry out a current limitation. Therefore, if the voltage is reduced when the electric motor is set in a regeneration state, the current is increased. Thus, the current cannot be limited depending on the state of the electric motor but is increased so that the excess current protecting function is fulfilled and a stall is caused by gate breaking in some cases.

In a method using a 0 voltage, moreover, a current is distorted so that the supply of a power to the electric motor is eliminated. As a result, the efficiency is reduced. For this reason, there is a problem in that the demand has not been met though a current limiting method having a high power efficiency is desired while a current is reliably dropped.

Furthermore, in the case in which a voltage is corrected by using a voltage limitation vector in a reverse direction to a detected current and PI control is carried out over the voltage limitation vector to correct a speed command, it is possible to decrease a current by compensating for a voltage with the vector in the reverse direction to the current. In the case in which the electric motor is set in a power state in order to carry out, over the speed command, the PI control for paying attention to only the magnitude of the current, the correction is carried out. In some cases of regeneration, the frequency correction has a bad influence and the current cannot be limited. Moreover, the PI control is used for a speed correcting method. In the case in which a great load is instantaneously applied, therefore, a great frequency correction corresponding thereto is carried out so that an unstable state is apt to be brought. Furthermore, there is a danger that the integration might be accumulated to cause runaway in the stable condition. The correction is performed in the directions of voltage corrections DVq and DVd which are not restricted to a voltage control axis direction but include a direction orthogonal thereto. For this reason, there is a problem in that it is hard to suppress the generation of a drawback such as hunting and a stability cannot be maintained.

Accordingly, it is an object of the invention to provide an inverter apparatus capable of reliably limiting a current to prevent the breakdown of a device and a stall irrespective of the state of an electric motor, thereby operating the electric motor efficiently and stably, and a current limiting method thereof.

DISCLOSURE OF THE INVENTION

In order to attain the object, the invention provides (1) an inverter apparatus for obtaining a voltage command vector from a frequency command value and a voltage command value calculated by a V/f operation based on the frequency command value, and carrying out a PWM modulation based on the voltage command vector, thereby outputting a voltage, comprising current detecting means for detecting a current vector having a magnitude of a current and a current phase, voltage limitation value calculating means for calculating a voltage limitation value which is proportional to an excess when the magnitude of the current exceeds a current limitation value, voltage limitation vector calculating means for converting the voltage limitation value into a voltage limitation vector based on the current phase, voltage correcting means for adding the voltage limitation vector to the voltage command vector, and acceleration correcting means for correcting an acceleration command of a frequency based on the voltage limitation value and the current phase.

Moreover, the invention is characterized in that (2) the voltage limitation value calculating means outputs, as a voltage limitation value, a result obtained by filtering a value proportional to an excess by means of a first order time-lag filter when the current limitation value is exceeded.

Furthermore, the invention is characterized in that (3) the voltage limitation vector calculating means converts the voltage limitation value into a vector in a reverse direction to the current phase.

Moreover, the invention is characterized in that (4) the voltage limitation vector calculating means calculates the voltage limitation value of a voltage limitation vector by setting, to zero, a component of the vector in the reverse direction to the current phase which is orthogonal to the voltage command vector direction.

Furthermore, the invention is characterized by (5) second current limiting means for forcibly outputting a PWM pattern of a zero voltage while a magnitude of a current exceeds a second current limitation value which is greater than the current limitation value, and third current limiting means for breaking a gate while the magnitude of the current exceeds a third current limitation value which is greater than the second current limitation value.

Moreover, the invention is characterized by (6) means for invalidating a function for the second current limiting means and the third current limiting means.

Furthermore, the invention is characterized by (7) a current limiting method of an inverter apparatus for obtaining a voltage command vector from a frequency command value and a voltage command value calculated by a V/f operation based on the frequency command value, carrying out a PWM modulation based on the voltage command vector, thereby outputting a voltage, and performing a protecting operation when an excess current is detected, comprising the steps of detecting a current vector including a magnitude Il of a current and a current phase $\theta i$, calculating a voltage limitation value $\Delta V$ which is proportional to an excess when the magnitude of the current exceeds a current limitation value Imax, converting the voltage limitation value $\Delta V$ into voltage limitation vectors $\Delta Vq$ and $\Delta Vd$ based on the current phase $\theta i$, adding them to the voltage command vector to carry out a voltage correction, thereby limiting the current instantaneously, and correcting an acceleration command of a frequency based on the voltage limitation value and the current phase, thereby carrying out a current limitation having a high power efficiency.

Moreover, the invention is characterized in that (8) the voltage limitation value $\Delta V$ is output by filtering a value proportional to an excess by means of a first order time-lag filter and removing higher harmonics when the magnitude of the current exceeds a current limitation value Imax.

Furthermore, the invention is characterized in that (9) the voltage limitation vectors $\Delta Vq$ and $\Delta Vd$ are created by converting the voltage limitation value $\Delta V$ into a vector $\Delta Vq$ =$-\Delta V \sin \theta i$ (or $\Delta Vq=-\Delta V \times Iq/Il$) and a vector $\Delta Vd=-\Delta V \cos \theta i$ (or $\Delta Vd=-\Delta V \times Id/Il$) in a reverse direction to the current phase $\theta i$.

Moreover, the invention is characterized in that (10) the voltage limitation value $\Delta V$ of the voltage limitation vector is obtained by setting, to zero, a Ad component of the vectors Δq and Δd in the reverse direction to the current phase θi which is orthogonal to the voltage command vector direction.

Furthermore, the invention is characterized by (11) the steps of forcibly outputting a PWM pattern of a zero voltage while the magnitude of the current exceeds a second current limitation value Icla' which is greater than the current limitation value Imax, and breaking a gate while the magnitude of the current exceeds third current limitation values Iclb' and Ioc' which are greater than the second current limitation value Icla'.

Moreover, the invention is characterized in that (12) a protection function based on the second and third current limitation values can be invalidated.

Figure 1:
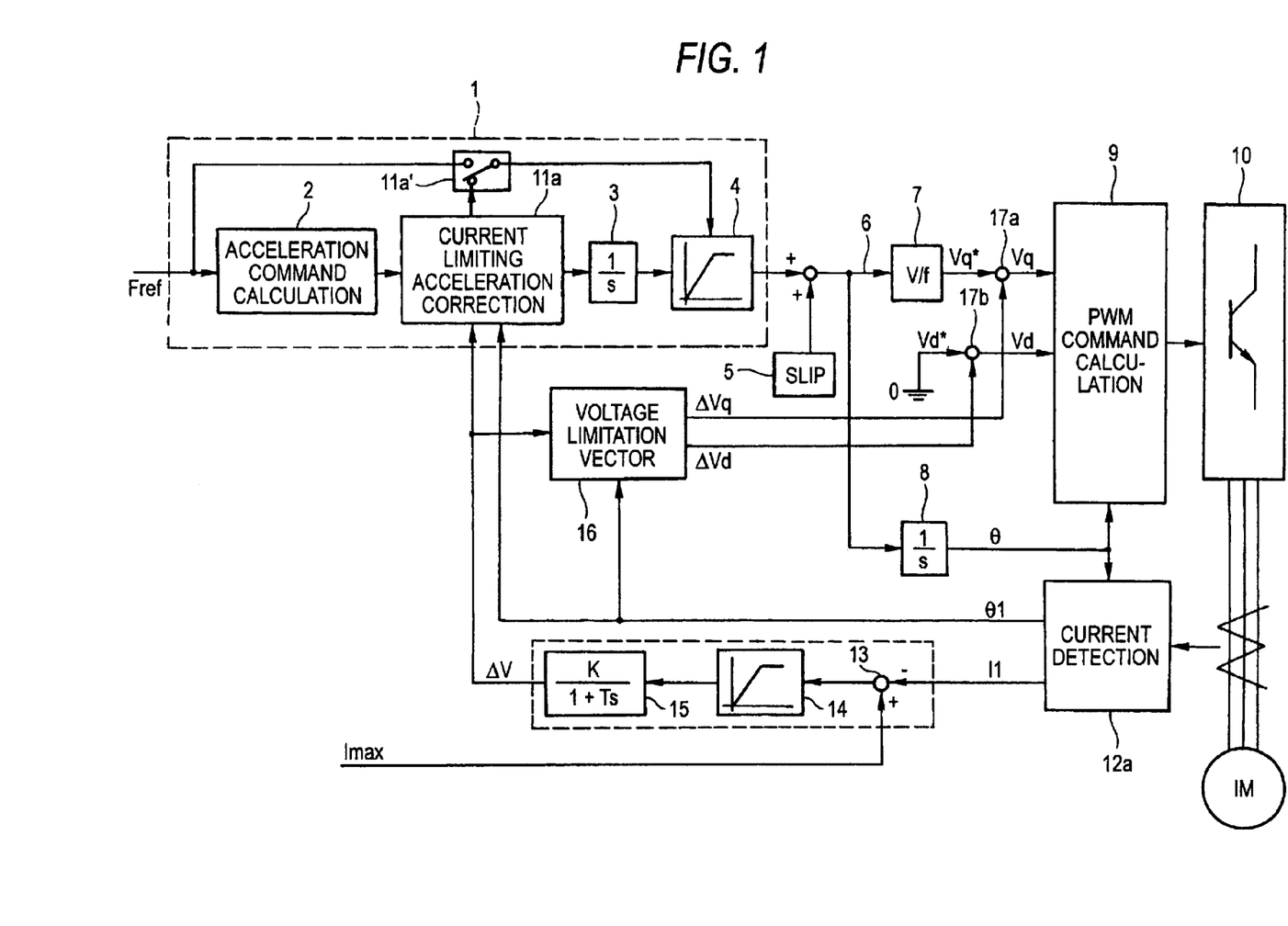
FIG. 1 is a control block diagram showing V/f control to be carried out by an inverter apparatus according to an embodiment of the invention.

According to the inverter apparatus and the excess current suppressing method thereof, the voltage limitation value ΔV which is proportional to the excess of the excess current limitation value Imax in FIG. 1 is obtained and is converted into the voltage limitation vectors ΔVq and ΔVd based on the current phase, and the voltage limitation vectors ΔVq and ΔVd are added to the voltage command vector. Consequently, the excess current can be suppressed instantaneously. In addition, the acceleration command of the frequency is corrected based on the voltage limitation value ΔV and the current phase θi. Consequently, it is possible to avoid a stall and to efficiently carry out an operation while limiting a current.

In that case, the voltage limitation value ΔV is caused to pass through a first order time-lag filter (K/1+Ts) and the voltage limitation vector is then obtained. Consequently, it is possible to carry out a stable compensation from which a high harmonic component included in a current is removed.

Moreover, when the voltage limitation value ΔV is to be converted into the voltage limitation vectors ΔVq and ΔVd, the voltage limitation vector is obtained in a reverse direction to a direction of a current and a compensation is thus carried out. Consequently, it is possible to instantaneously limit a current for the use such as a resistance load. In the case in which a motor is to be controlled, moreover, the direction component ΔVd which is orthogonal to the voltage command vector in the component of the voltage limitation vector in the reverse direction to the current is set to be zero, and only the direction of the voltage command vector to be V/f controlled is thus compensated. Consequently, stable current limitation control can be carried out.

As a measure for protection in the case in which the current limitation is not carried out normally, the PWM pattern of a zero voltage is forcibly output to carry out a protecting operation while the magnitude I1 of the current exceeds the second excess current limitation value Icla' which is greater than the excess current limitation value Imax, and the gate is broken and protected while the magnitude I1 of the current exceeds the third excess current limitation value Iclb' or Ioc' which is greater than the second excess current limitation value Icla'. Even if the magnitude I1 the current greatly exceeds the excess current limitation value Imax, consequently, the second and third excess current limitation values Icla', Iclb' and Ioc' are protected in three stages. Therefore, it is possible to suppress an excess current reliably and safely. In this case, the relationship between the set levels of Ioc' >Iclb'>Icla'>Imax is obtained.

In the invention, accordingly, the suppression can be carried out almost completely based on the excess current limitation value Imax. Therefore, it is possible to increase the values of the set levels Ioc, Iclb and Icla of CLA and CLB circuits having excess current levels set in the conventional case.

Moreover, the control of the excess current limitation value Imax is almost enough. Therefore, switching means 29a and 29b for invalidating the CLA and CLB circuits are provided such that the CLA and CLB circuits can be turned ON/OFF. Thus, the control can be carried out widely.

In the drawings, 1 denotes a frequency command calculating section, 2 denotes acceleration command calculating means, 3 denotes acceleration frequency integrating means, 4 denotes command value limiting means, 5 denotes slip frequency calculating means, 6 denotes an output frequency, 7 denotes a V/f calculating section, 8 denotes phase calculating means, 9 denotes a PWM command calculating section, 10 denotes a gate driver circuit, 11a denotes current limiting acceleration correcting means, 11a' denotes frequency command switching means, 12a denotes current detecting means, 13 denotes current comparing means, 14 denotes a limit circuit, 15 denotes voltage limitation value calculating means, 16 denotes voltage limitation vector calculating means, 17a denotes q-axis adding means, 17b denotes d-axis adding means, 18 denotes a 0 voltage pattern generating circuit, 19, 20 and 21 denote comparators, 22, 23 and 24 denote latch circuits, 25 denotes a 0 voltage switching circuit, 26 denotes an on delay circuit, 27 denotes a gate breaking selection circuit, 28 denotes a gate breaking selection circuit, and 29 denotes invalidating means.

BEST MODE FOR CARRYING OUT THE INVENTION

An embodiment of the invention will be described below with reference to the drawings.

FIG. 1 is a control block diagram showing V/f control to be carried out by an inverter apparatus according to an embodiment of the invention.

Figure 2:
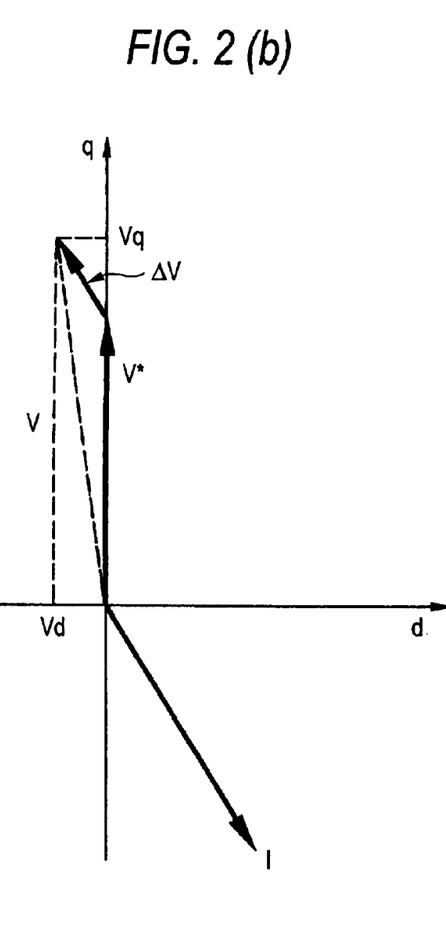
FIGS. 2(a) and 2(b) show the vector diagrams in the control of the inverter apparatus illustrated in FIG. 1.

FIG. 2 is a vector diagram in the control of the inverter apparatus illustrated in FIG. 1.

FIG. 3 is a vector diagram showing the case in which Vd is set to be 0 in FIG. 2.

Figure 4:
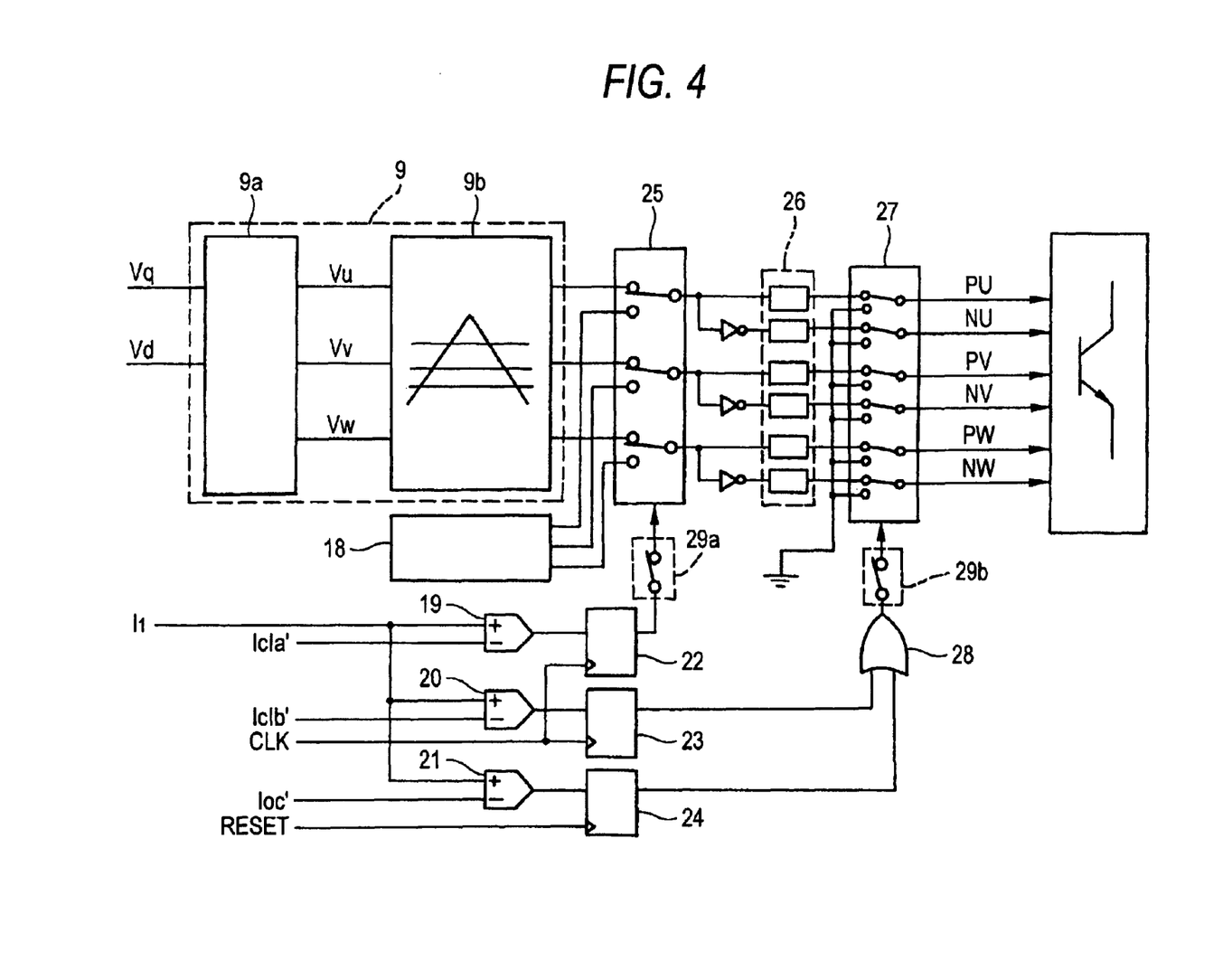
FIG. 4 is a block diagram showing the current limiting circuit of the inverter apparatus illustrated in FIG. 1.

FIG. 4 is a block diagram showing the current limiting circuit of the inverter apparatus illustrated in FIG. 1.

In FIG. 1, 11a denotes current limiting acceleration correcting means for correcting an acceleration, 11a' denotes frequency command switching means for switching a frequency command and a current limiting output frequency, 12a denotes current detecting means for outputting a magnitude I1 of a current and a current phase θi, 13 denotes current comparing means for comparing a detected current I1 with an excess current limitation value Imax, 14 denotes a limit circuit for outputting a result of the comparison, 15 denotes voltage limitation value calculating means for calculating a voltage limitation value $\Delta V$, 16 denotes voltage limitation vector calculating means for calculating voltage limitation vectors $\Delta Vq$ and $\Delta Vd$, and 17a and 17b denote voltage limitation vector adding means.

The same structures as those in FIG. 5 have the same reference numerals and repetitive description will be omitted.

In FIG. 4, 29a and 29b denote current limiting circuit invalidating means, Icla' denotes a second current limitation value, and Iclb' and Ioc' denote a third current limitation value.

The same structure as those in FIG. 6 have the same reference numerals and repetitive description will be omitted.

Next, an operation will be described.

First of all, the magnitude I1 of the current and the current phase $\theta i$ for a reference phase $\theta$ are obtained by the current detecting means 12a and the magnitude I1 of the current is subtracted from a current limitation value Imax set by the current comparing means 13. If a result of the subtraction is negative, 0 is set by the limit circuit 14 and gain and filter processings (K/1+Ts) are carried out to calculate the voltage limitation value $\Delta V$ by the voltage limitation calculating means 15. In the voltage limitation vector calculating means 16, dq-axis voltage limitation values $\Delta Vq$ and $\Delta Vd$ are calculated by the following equations based on the voltage limitation value $\Delta V$ and the current phase $\theta i$ which are obtained.

$\Delta Vq = -\Delta V \sin\theta i$ $\Delta Vd = -\Delta V \cos\theta i$

The same results are obtained by using current detection values Id and Iq in the following equations.

$\Delta Vq = -\Delta V \times Iq/I1$ $\Delta Vd = -\Delta V \times Id/I1$

Next, $\Delta Vq$ and $\Delta Vd$ thus obtained are added to voltage commands Vq* and Vd* by the adding means 17a and 17b to calculate output voltage commands Vq and Vd, and a three-phase (UVW phase) voltage command is obtained and is converted into a PWM pattern by the PWM command calculating section 9, and the PWM pattern is output to the gate driver circuit 10 and a voltage is applied to an electric motor IM. Consequently, the current can be limited instantaneously.

Referring to the relationship among the voltage limitation vector $\Delta V$, a voltage command vector V* and a current vector I, FIG. 2(a) shows the case of a power state and FIG. 2(b) shows the case of a regeneration state.

FIG. 2(a) shows the state in which the voltage limitation vector $\Delta V$ in a reverse direction to a current is added to the voltage command V* on the q axis to drop a voltage V to be applied, thereby limiting the current vector I.

FIG. 2(b) shows the regeneration state in which $\Delta V$ is added in the same direction to raise the applied voltage V, thereby limiting the current vector I.

Thus, it is possible to instantaneously limit the current irrespective of the state of the electric motor.

In some cases in which a motor is to be controlled by V/I control, moreover, an unstable state is brought depending on the condition of the motor or a load. In such a state, if a voltage correction is carried out for each of the d and q axes as shown in FIG. 2, the control can be performed in the direction of the q axis and is not performed in the direction of the d axis. In some cases, therefore, the unstable state cannot be avoided.

As shown in FIG. 3, accordingly, $\Delta Vd$ is set to be 0 and only $\Delta Vq$ is controlled to be added to the voltage command V*. Thus, the unstable state can be avoided.

Figure 3A:
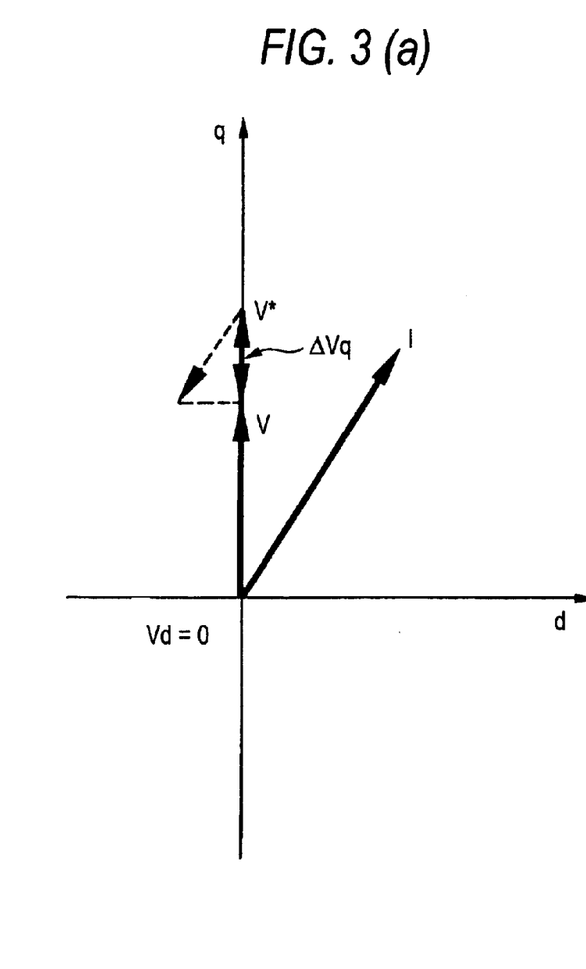
FIGS. 3(a) and 3(b) show the vector diagrams showing the case in which Vd is set to be 0 in FIGS. 2(a) and 2(b).
Figure 3B:
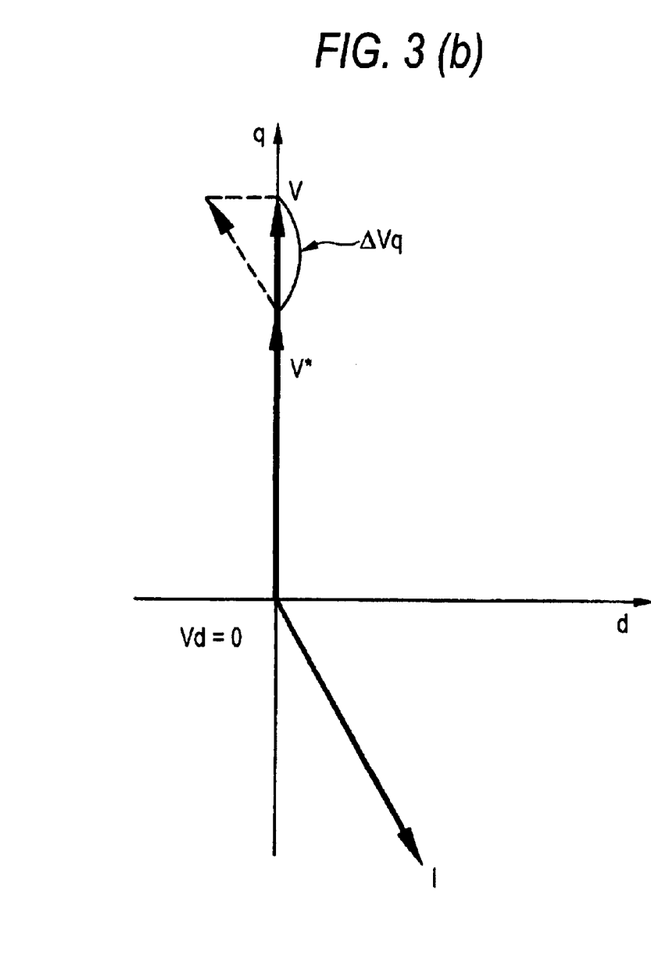

FIG. 3(a) shows the power state and FIG. 3(b) shows the regeneration state. In FIG. 3(a), the voltage limitation vector $\Delta Vq$ in a reverse direction is added to the voltage command V* to drop the voltage V, thereby limiting the current I. In FIG. 3(b), the voltage V is raised to limit the current I. Actually, if the control is normally carried out and rotations are performed to some extent, the current is increased in the direction of the q axis. Consequently, the capability of suppressing the current can fully be obtained by the correction of only $\Delta Vq$.

While the current can be limited instantaneously by the above operation, it is necessary to stationarily limit the current and to correct a frequency in consideration of the efficiency of the electric motor. Correspondingly, the current limiting acceleration correcting means 11a shown in FIG. 1 decides whether the state of the electric motor is power or regeneration by using the current phase $\theta i$ and sets the direction of the correction of an acceleration, and corrects the magnitude of the acceleration by using the voltage limitation value $\Delta V$. The amount of the correction is calculated by using a set value or a load direction component calculation value of the voltage limitation value $\Delta V$.

Moreover, the current limiting acceleration correcting means 11a outputs a frequency command in a current limitation in such a manner that a maximum value is the highest frequency in the case of the regeneration and a minimum value is zero in the case of the power depending on the state of the load, and switches the frequency command and the output frequency in the current limitation by the frequency command switching means 11a'.

Examples of the decision of the power/regeneration include various methods, for example, a method of referring to only a q-axis current and a method of carrying out a calculation from a reactive power, which will be omitted.

The acceleration correction is carried out based on a rotating direction and a load direction in the following manner.

a) Carry out the correction to the positive side in the case of a normal rotation and power.

b) Carry out the correction to the negative side in the case of the normal rotation and regeneration.

c) Carry out the correction to the negative side in the case of a reverse rotation and the power.

d) Carry out the correction to the positive side in the case of the reverse rotation and the regeneration.

In the simplest method of correcting an acceleration, an acceleration and deceleration set value is substituted for an acceleration in such a manner that the acceleration is stopped in a power load if the voltage limitation value $\Delta V$ is not zero during the acceleration, and a deceleration is carried out in a power and the acceleration is carried out in regeneration if $\Delta V$ is not zero during stationary running. Also by these methods, an excess current can fully be suppressed.

Moreover, a current limiting circuit shown in FIG. 4 is used as measures for protection in the case in which an unexpected fluctuation in a current is carried out. In the circuit of FIG. 4, in the case in which a detected current I1 greater than a higher excess current level Ioc' than a current limitation value Imax, a gate breaking signal is selected and output by a gate breaking circuit 27.

In the case in which the current I1 is smaller, furthermore, it is compared with a current limitation level Iclb'. If the current I1 is greater, the gate breaking signal is output in the same manner.

In the case in which the current I1 smaller and is greater than a current limitation level Icla', a 0 voltage pattern is output.

In this case, the relationship of each level is as follows.

Ioc'>Iclb'>Icla'>Imax

In addition, the limitation can be carried out in considerable parts by the control of the voltage limitation vectors $\Delta Vq$ and $\Delta Vd$ shown in FIG. 1 and the current limiting acceleration correction. Therefore, it is possible to set the excess current levels Ioc', Iclb' and Icla' to have values (Ioc' >Ioc, Iclb'>Iclb, and Icla'>Icla) obtained by increasing the corresponding excess current levels Ioc, Iclb and Icla shown in the conventional example of FIG. 6. Thus, a stall can be prevented.

In some cases, the control of FIG. 1 is enough depending on the uses. Consequently, the current limiting circuit of FIG. 4 is separated and invalidated by the invalidating means 29a and 29b. Thus, a 0 voltage switching circuit 25 and the switching portion of the gate breaking selection circuit 27 can be excluded.

The invalidating means 29 can employ any method capable of turning ON/OFF the current limiting circuit in a desirable configuration (including automatic/manual operations).

According to the embodiment, thus, the current phase $\theta i$ and the magnitude I1 of the current are detected and the magnitude I1 of the current is compared with the current limitation value Imax to obtain the voltage limitation value $\Delta V$. The voltage limitation value $\Delta V$ is converted into a reverse direction to the current phase, and the voltage limitation vectors $\Delta Vq$ and $\Delta Vd$ are obtained and are added to the voltage command so that the current limitation can be carried out instantaneously. In addition, the acceleration is corrected by using the voltage limitation value $\Delta V$ and the current phase $\theta i$ so that a stall can be prevented and an operation can be carried out efficiently.

INDUSTRIAL APPLICABILITY

As described above, according to the invention, a voltage limitation vector which is proportional to the excess of a current limitation value in a reverse direction to a current vector or has a component on a voltage command axis in the reverse direction is added to a voltage command. Consequently, a current can be limited instantaneously. By a current limiting method having three levels, furthermore, it is possible to reliably prevent the breakdown of a device and a stall from being caused by the current.

By correcting an acceleration based on a voltage limitation value and a current phase, moreover, the current can be stationarily limited and an induction motor can be operated efficiently.

What is claimed is:

1. An inverter apparatus for obtaining a voltage command vector from a frequency command value and a voltage command value calculated by a V/f operation based on the frequency command value, and carrying out a PWM modulation based on the voltage command vector, thereby outputting a voltage, comprising:

current detecting means for detecting a current vector having a magnitude of a current and a current phase, voltage limitation value calculating means for calculating a voltage limitation value which is proportional to an excess when the magnitude of the current exceeds a current limitation value, voltage limitation vector calculating means for calculating the voltage limitation value of a voltage limitation vector by setting, to zero, a component of a vector in a reverse direction to the current phase which is orthogonal to the voltage command vector direction, voltage correcting means for adding the voltage limitation vector to the voltage command vector, and acceleration command frequency based on the voltage limitation value and the current phase.

2. An inverter apparatus for obtaining a voltage command vector from a frequency command value and a voltage command value calculated by a V/f operation based on the frequency command value, and carrying out a PWM modulation based on the voltage command vector, thereby outputting a voltage, comprising:

current detecting means for detecting a current vector having a magnitude of a current and a current phase, voltage limitation value calculating means for calculating a voltage limitation value which is proportional to an excess when the magnitude of the current exceeds a current limitation value, voltage limitation vector calculating means for converting the voltage limitation value into a voltage limitation vector in a reverse direction to the current phase, voltage correcting means for adding the voltage limitation vector to the voltage command vector, second current limiting means for forcibly outputting a PWM pattern of a zero voltage while the magnitude of the current exceeds a second current limitation value which is greater than the current limitation value, and third current limiting means for blocking gates of switching devices while the magnitude of the current exceeds a third current limitation value which is greater than the second current limitation value.

3. The inverter apparatus according to claim 2, further comprising means for invalidating a function for the second current limiting means and the third current limiting means.

4. The inverter apparatus according to claim 2 or 3, further comprising acceleration correcting means for correcting an acceleration command of a frequency based on the voltage limitation value and the current phase.

5. A current limiting method of an inverter apparatus for obtaining a voltage command vector from a frequency command value and a voltage command value calculated by a V/f operation based on the frequency command value, carrying out a PWM modulation based on the voltage command vector, thereby outputting a voltage, and performing a protecting operation when an excess current is detected, comprising the steps of:

detecting a current vector having a magnitude of I1 of a current and a current phase $\theta i$, calculating a voltage limitation value $\Delta V$ which is proportional to an excess when the magnitude of the current exceeds a current limitation value Imax, converting the voltage limitation value $\Delta V$ into voltage limitation vectors $\Delta Vq=-\Delta V\sin\theta i$ (or $\Delta Vq=-V\times Iq/I1$) and $\Delta Vd=0$ based on the current phase $\theta i$, adding them to the voltage command vector to carry out a voltage correction, thereby limiting a current instantaneously, and correcting an acceleration command of a frequency based on the voltage limitation value $\Delta V$ and the current phase $\theta i$, thereby carrying out a current limitation having a high power efficiency.

6. A current limiting method of an inverter apparatus for obtaining a voltage command vector from a frequency command value and a voltage command value calculated by a V/f operation based on the frequency command value, carrying out a PWM modulation based on the voltage command vector, thereby outputting a voltage, and performing a protecting operation when an excess current is detected, comprising the steps of:

detecting a current vector having a magnitude I1 of a current and a current phase θi, calculating a voltage limitation value ΔV which is proportional to an excess when the magnitude of the current exceeds a current limitation value Imax, converting the voltage limitation value ΔV into vectors ΔVq=−ΔVsin θi (or ΔVq=−ΔV× Iq/I1) and ΔVd=−ΔVcos θi (or ΔVd=−ΔV×Id/I1) in reverse direction to the current phase θi, adding them to the voltage command vector to carry out a voltage correction, thereby limiting a current, forcibly outputting a PWM pattern of a zero voltage while the magnitude I1 of the current exceeds a second current limitation value Id1a' which is greater than the current limitation value Imax, and blocking gates of switching devices to instantaneously limit the current while the magnitude I1 of the current exceeds a third current limitation value Ic1b' which is greater than the second limitation value Ic1b' and is smaller than a circuit protection level Ioc'.

7. The current limiting method of an inverter apparatus according to claim 6, wherein a protection function based on the second and third current limitation values can be invalidated.

8. The current limiting method of an inverter apparatus according to claims 6 and 7, wherein an acceleration command of a frequency is corrected based on the voltage limitation value ΔV and the current phase θi, thereby carrying out a current limitation having a high power efficiency.

* * * * *